United States Patent [19]
Hook et al.

[11] 3,815,044
[45] June 4, 1974

[54] SOLID STATE LASER APPARATUS WITH AUXILIARY INTRA-CAVITY MIRROR ELEMENTS

[75] Inventors: William R. Hook, Los Angeles; Roland H. Dishington, Pacific Palisades; Ronald P. Hilberg, Redondo Beach, all of Calif.

[73] Assignee: TRW Inc., Redondo Beach, Calif.

[22] Filed: Feb. 5, 1973

[21] Appl. No.: 329,652

[52] U.S. Cl. .......................................... 331/94.5 C
[51] Int. Cl. ........................... H01s 3/08, H01s 3/05
[58] Field of Search .................................... 331/94.5

[56] References Cited
UNITED STATES PATENTS
3,230,475  1/1966  Koester et al. .................... 331/94.5

OTHER PUBLICATIONS
Sinclair et al., Applied Optics, Vol. 6, No. 5, May, 1967, pp. 845–849.

Primary Examiner—Ronald L. Wibert
Assistant Examiner—R. J. Webster
Attorney, Agent, or Firm—Daniel T. Anderson; Jerry A. Dinardo; Edwin A. Oser

[57] ABSTRACT

A pair of intra-cavity auxiliary mirror elements are mounted at opposite ends of a laser rod. The mirror elements are provided with a central aperture to pass the main laser beam and with reflecting surfaces facing the cavity mirror to intercept and recover and stray light rays that result from thermal focusing effects in the laser rod when it is flashed at high repetition rates.

5 Claims, 3 Drawing Figures

PATENTED JUN 4 1974    3,815,044

PRIOR ART

SOLID STATE LASER APPARATUS WITH AUXILIARY INTRA-CAVITY MIRROR ELEMENTS

BACKGROUND OF THE INVENTION

1. Field of the Invention

This invention relates to solid state lasers and more particularly to means for improving the efficiency of such lasers when they are operated at high repetition rates.

2. Description of the Prior Art

Solid state laser rods, when operated in a laser cavity in pulsed mode at high repetition rates, usually exhibit a gradual fall-off in lasing efficiency. One principal reason for this fall-off efficiency relates to thermal focusing effects within the laser rod.

Independent measurements can be made on the laser rod by itself, that is, apart from the laser cavity, which show that the rod acts as a focusing element, where the effective focal length of the laser rod gets shorter and shorter as the rate of flashing the pumping lamp is increased. In these measurements, a collimated beam from a gas laser is caused to impinge one end of a laser rod, and while the laser rod is flashed or pumped repetitively by means of a flash lamp, the focal point of the light rays emanating from the other end of the laser rod is determined. The distance from the middle of the laser rod to the focal point of the output rays is taken as the focal length of the laser rod. A plot of the focal length of the laser rod as a function of the repetition rate of the flash lamp shows that with increasing repetition rates above approximately five pulses per second for a Nd:glass laser rod, or approximately 30 pulses per second for a Nd:YAG laser rod, the focal length decreases exponentially.

The thermal focusing is caused by the fact that a temperature gradient, with circular symmetry, is established within the laser rod because energy is inserted into the rod uniformly by way of optical pumping, and yet is removed only through the edges of the rod. A typical plot of the temperature distribution occuring along the diameter of the rod shows a temperature gradient that increases at an exponentially decreasing rate from the outer surface to the center of the rod. The rod typically reaches this temperature distribution within 5 to 30 seconds of operation.

The thermal gradient causes focusing in two ways. Firstly, the rod actually assumes a slight lens-like shape due to mechanical expansion. Secondly, due to the fact that the index of refraction is a function of temperature there is also a bulk lens effect caused by the temperature gradient. In some types of laser rods, one of the two effects may dominate, although usually both are present. In any event, the relationship between the measured thermal focusing of the laser rod itself apart from the laser cavity as above described and the fall-off in efficiency of the complete laser cavity are well documented by experiments such as those described above as well as those of others.

The problem that this invention is designed to solve is that of the lost efficiency at high repetition rates. In particular, it will be shown how to recover a significant part of the lost efficiency.

SUMMARY OF THE INVENTION

In a solid state laser including a solid state active laser element provided with a pair of optical end surfaces disposed between a pair of mirror elements that are optically aligned with said laser element along a laser axis to form an optical cavity, a pair of auxiliary mirror elements are interposed one on each side of the laser element. Each auxiliary mirror element has a single aperture aligned with the laser axis and in registry with the optical end surfaces of the laser element. The apertures are congruent with the optical end surfaces and are positioned closely thereto.

The auxiliary mirror elements are provided with reflecting surfaces facing the optical cavity mirror elements that intercept the laser light rays that usually stray off the main laser beam path and reflect them in a way that they can be put to use. In one embodiment the reflecting surfaces are spherically curved concave towards the cavity mirror elements so that the stray light rays are reflected back into the main laser beam. In another embodiment, the reflecting surfaces are planar and inclined relative to a plane normal to the laser axis so that the stray light rays are reflected at an angle to the laser axis to serve as auxiliary laser beams.

DESCRIPTION OF THE PREFERRED EMBODIMENTS

It has been demonstrated experimentally that the loss in laser efficiency of a solid state laser operating at high repetition rates, that is, at repetition rates above approximately five pulses per second for a Nd:glass laser rod, or approximately 30 pulses per second for a Nd:YAG laser rod, results from laser energy being diverted away from the ends of the laser rod due to the presence of internal focusing effects. Such experimental experience has also indicated that these energy losses are inherent in the conventional laser type cavity consisting of a solid state laser rod disposed between two optically reflecting mirrors, one of which is partially transmissive.

Figure 1:
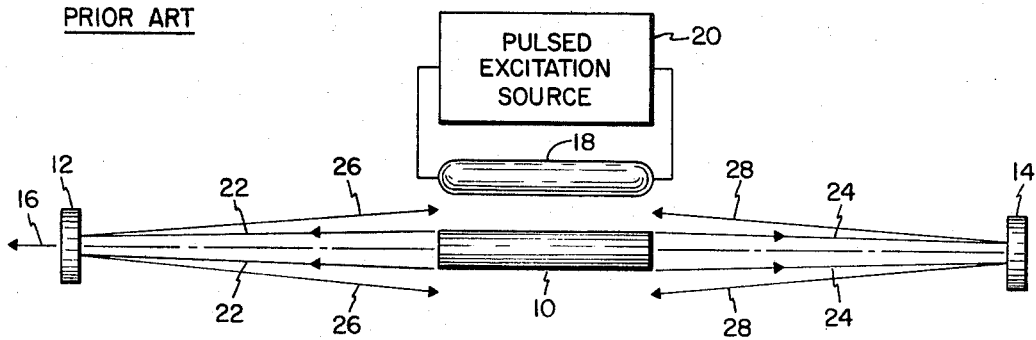
FIG. 1 is a diagrammatic view of a conventional solid state laser showing stray light being diverted off the main laser beam path at high pulse repetition rates.

Reference is now made to FIG. 1 which shows a conventional pulsed, solid state laser oscillator including a laser rod 10 of any suitable solid state laserable material disposed between two mirrors 12 and 14 that comprise the optical cavity. The rear mirror 14 is substantially 100 percent reflecting, whereas the output mirror 12 is only about 70 percent reflecting and thus partially transmissive so that an output laser beam 16 can issue therefrom. The laser rod 10 is optically pumped by a flash lamp 18 which receives electrical excitation energy from a pulsed excitation source 20. The excitation source 20 is capable of flashing the flash lamp 18 at repetition rates above 50 pulses per second.

FIG. 1 shows that the light rays emanating from the ends of the laser rod 10, which rays are indicated as falling within the area bounded by the lines 22 and 24, are convergent along their path towards the mirrors 12 and 14 respectively, and that the light rays reflected from the mirrors 12 and 14, which rays are indicated as falling within the area bounded by the lines 26 and 28 respectively, are divergent along their return path towards the ends of the laser rod 10. Thus some of the reflected light rays are diverted off the main beam path so that they do not impinge on the ends of the laser rod 10 but rather are directed past the laser rod 10. The diverted light rays thus escape from the cavity as light loss and thereby result in reduced laser efficiency. Furthermore, the stray energy may cause damage to some of the hardware used to mount the laser rod, such as O-ring mountings. At higher rates, more of the power is diverted off the main beam path and out of the laser cavity.

Figure 2:
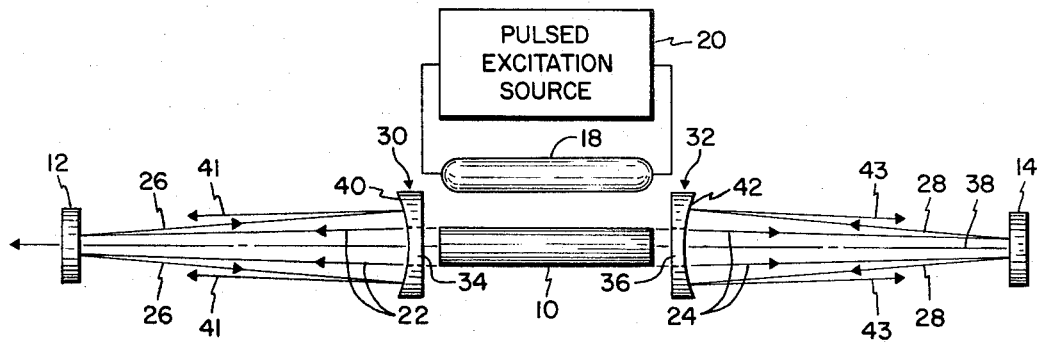
FIG. 2 is a diagrammatic view of a solid state laser employing spherically curved intra-cavity auxiliary mirror elements to recover the stray light.

The above described light loss due to thermal focusing effects in the solid state laser rod is recovered according to the invention by inserting a pair of additional mirrors in the optical cavity. Referring now to FIG. 2, laser apparatus according to FIG. 1 is shown modified by interposing two additional or auxiliary mirrors 30 and 32 within the optical cavity, one adjacent to each end of the laser rod 10. One of the auxiliary mirrors 30 is placed between one end of the laser rod 10 and the output mirror 12, and the other auxiliary mirror 32 is placed between the other end of the laser rod 10 and the rear mirror 14.

Each of the two auxiliary mirrors 30, 32 has a single central aperture 34, 36 respectively, that is aligned with and congruent with the ends of the laser rod 10, so that the cavity mirrors 12 and 14, laser rod 10, and auxiliary apertured mirrors 30 and 32 are all coaxial with the main laser axis 38. The auxiliary mirrors 30 and 32 are mounted close to the ends of the laser rod 10.

The auxiliary mirrors 30 and 32 are provided with totally reflecting, spherically concave curved surfaces 40 and 42 facing the cavity mirrors 12 and 14 respectively. The reflecting surfaces 40 and 42 of the auxiliary mirrors 30 and 32 may be prepared in the same conventional manner as that of the rear mirror 14. The auxiliary mirrors 30 and 32 are positioned so that their spherically concave reflecting surfaces 40 and 42 intercept the light rays that are diverted from the laser rod 10, and hence usually lost, and return these normally lost light rays to the optical cavity by reflecting them back towards the cavity mirrors 12 and 14 in the direction indicated by the arrows 41 and 43. Yet the auxiliary mirrors 30 and 32 do not interfere with the main laser beam because the apertures 34 and 36 are dimensioned the same as the end of the laser rod 10 and thus transmit all the light rays that are normally emitted from and received by the ends of the laser rod 10. In addition to reducing the aforementioned light losses, the auxiliary mirrors 30 and 32 prevent damage to the laser rod mounting hardware from the stray light energy.

Figure 3:
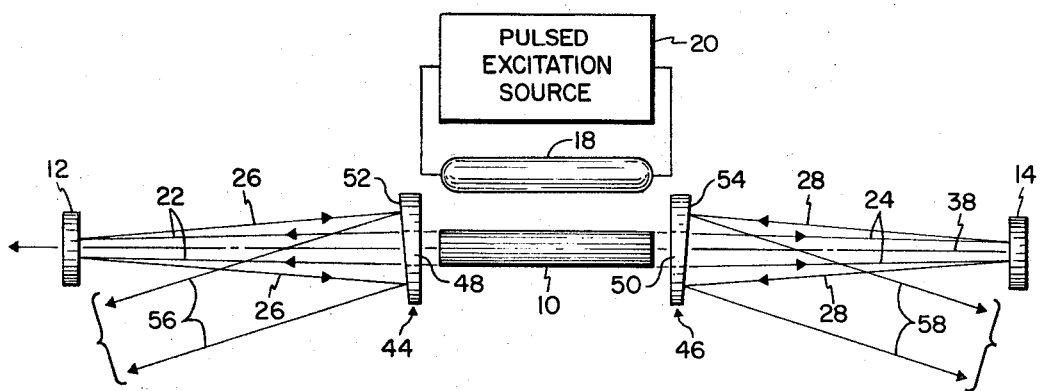
FIG. 3 is a diagrammatic view of a solid state laser employing planar, inclined intra-cavity auxiliary mirror elements to recover the stray light.

FIG. 3 shows a modified form of auxiliary mirror structure for directing the stray light energy off the laser beam axis but in one or more directions to form one or more useful auxiliary light beams. In the embodiment of FIG. 3, auxiliary mirrors 44 and 46 are provided with single central apertures 48 and 50, respectively, similar to the apertures 34 and 36 in FIG. 2. The auxiliary mirrors 44 and 46 are also provided with totally reflecting surfaces 52 and 54 on their sides facing the cavity mirrors 12 and 14 respectively.

The totally reflecting surfaces 52 and 54 in this instance are flat and are inclined with respect to a plane normal to the main laser axis 38. The planar reflecting surfaces 52 and 54 intercept the light rays that stray off the main beam path and reflect them, as shown by lines 56 and 58, in directions that are acute to the directions of the cavity mirrors 12 and 14 from the ends of the laser rod 10.

The reflected light rays 56 and 58 form auxiliary light beams that are subordinate to the main laser beam 16. These auxiliary light beams can be used in Q-switching apparatus of the kind disclosed in U.S. Pat. No. 3,577,097 issued May 4, 1971 to Ronald P. Hilberg. The angle of inclination of the reflecting surfaces 52 and 54 need only be sufficient to allow the reflected light rays 56 and 58 to clear the cavity mirrors 12 and 14.

Experiments have shown that the amount of reflected energy represented by the light rays 56 and 58 increases with increasing laser pulse repetition rate, while the total useful output energy represented by the sum of the energy of the main laser beam 16 and the energy of the auxiliary beams or light rays 56 and 58 remains substantially constant.

What is claimed is:

1. In a laser apparatus including a solid state active laser element provided with a pair of optical end surfaces aligned along a central laser axis;

an optical resonant cavity formed by a pair of main mirror elements spaced apart and optically aligned along said laser axis with said laser element disposed therebetween for defining a main laser beam path; and a pulsed excitation source for pumping said laser element at sufficiently high repetition rate to produce thermal focussing effects in said laser element that normally cause some of the light energy emanating from said element and reflected from said mirror elements to stray off said main laser beam path; the improvement comprising:

a pair of auxiliary apertured mirror elements mounted within said optical resonant cavity one on each side of said active laser element;

said auxiliary apertured mirror elements each provided with a single aperture aligned with said laser axis and in registry with the optical end surfaces of said active laser element;

said apertures being congruent with and spaced close to said optical end surfaces;

said auxiliary apertured mirror elements having surfaces facing said main mirror elements that are substantially totally optically reflecting for intercepting said stray light energy and reflect it back towards said main mirror elements and into said main laser beam path.

2. The invention according to claim 1, wherein the reflecting surfaces of said apertured mirror elements are spherically concave and axially aligned with said laser axis for reflecting the stray light energy back towards said main mirror elements and into said main laser beam path.

3. The invention according to claim 1, wherein said laser element comprises a cylindrical rod of given circular diameter and wherein the apertures of said apertured mirror elements have a circular diameter substantially equal to that of said cylindrical rod.

4. The invention according to claim 1, wherein said laser element is formed from neodymium-glass and further wherein said pulse excitation source includes optical pumping means arranged to pulse said laser element at a repetition rate in excess of five pulses per second.

5. The invention according to claim 1, wherein said laser element is formed from neodymium-yttrium aluminum garnet, and further wherein said pulse excitation source includes optical pumping means arranged to pulse said laser element at a repetition rate in excess of 30 pulses per second.

* * * * *